(12) United States Patent
Solan et al.

(10) Patent No.: US 10,548,298 B2
(45) Date of Patent: Feb. 4, 2020

(54) DOG COLLAR LIGHT

(71) Applicants: Denis Solan, San Rafael, CA (US); Ronald Kaupp, San Rafael, CA (US); Kenneth A Tarlow, San Rafael, CA (US)

(72) Inventors: Denis Solan, San Rafael, CA (US); Ronald Kaupp, San Rafael, CA (US); Kenneth A Tarlow, San Rafael, CA (US)

(*) Notice: Subject to any disclaimer, the term of this patent is extended or adjusted under 35 U.S.C. 154(b) by 194 days.

(21) Appl. No.: 15/904,378

(22) Filed: Feb. 25, 2018

(65) Prior Publication Data

US 2019/0261604 A1  Aug. 29, 2019

(51) Int. Cl.
| | |
|---|---|
| *A01K 27/00* | (2006.01) |
| *F21L 4/08* | (2006.01) |
| *F21V 21/26* | (2006.01) |
| *F21V 21/14* | (2006.01) |
| *F21V 21/30* | (2006.01) |
| *F21V 21/08* | (2006.01) |
| *F21L 4/04* | (2006.01) |

(52) U.S. Cl.
CPC .............. *A01K 27/006* (2013.01); *F21L 4/08* (2013.01); *F21V 21/145* (2013.01); *F21V 21/26* (2013.01); *F21V 21/30* (2013.01); *F21L 4/04* (2013.01); *F21V 21/08* (2013.01)

(58) Field of Classification Search
CPC .......... A01K 27/006; F21L 4/04; F21L 4/045; F21L 4/08; F21L 4/085; F21V 21/08; F21V 21/145; F21V 21/26; F21V 21/30
See application file for complete search history.

(56) References Cited

U.S. PATENT DOCUMENTS

| | | | | |
|---|---|---|---|---|
| 5,359,501 A | * | 10/1994 | Stevens .................. | A41F 9/002 362/108 |
| 10,317,048 B2 | * | 6/2019 | Hutchens ............ | F21V 21/0885 |
| 2004/0246706 A1 | * | 12/2004 | Simoni ................ | A01K 27/006 362/108 |
| 2010/0177503 A1 | * | 7/2010 | Lau ........................... | F21L 4/08 362/105 |
| 2014/0192517 A1 | * | 7/2014 | Alvarado .............. | F21V 21/145 362/103 |

* cited by examiner

*Primary Examiner* — Blake A Tankersley (57) ABSTRACT

A dog collar light with An LED housing, an electronics housing, left and right-side knobs, a front lens, LED lights, a battery and an elastic attachment band. The LED housing can pivot within arms extending from each side of the electronics housing. The electronic housing also includes a fur guard to help keep fur from blocking the LED lights. The side knobs are used for rotating the LED housing up or down and are made of transparent material so that light can shine out from either from the front lens of the LED housing or from the left and right knobs. The LED lights are powered by a battery located within the electronics housing. The elastic band attaches to the electronics housing and holds it to a dog collar so that the LED lights can shine light onto the ground in front of the dog.

2 Claims, 8 Drawing Sheets

DOG COLLAR LIGHT

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of portable LED lights and more specifically to a dog collar light. Various types of portable LED lights have been designed for many special applications. They are popular because they are small, lightweight and require a relatively small amount of electrical power. Some recent LED lights have been designed for dogs such as an illuminated leash and even an illuminated dog collar. However, there is a deficiency in the prior technology in that none of the existing LED lights can be worn by a dog to actually transmit light forward to illuminate the ground in front of the dog as the dog walks at night. Additionally, none of the existing lights for dogs include left and right facing auxiliary lights that allow other people see the dog from the right or left side. Additionally, none of the existing lights for dogs include a fur guard to help prevent fur from falling down in front of the light. Finally, none of the existing lights for dogs is aimable so that the light can be shown directly below the dog or further out ahead of the dog.

BRIEF SUMMARY OF THE INVENTION

The primary object of the invention is to provide an LED light assembly that can attach to a dog collar to illuminate the ground directly in front of the dog wearing the collar.

Another object of the invention is to provide a dog collar light that is aimable.

Another object of the invention is to provide a dog collar light that provides forward shining light as well as side lights.

A further object of the invention is to provide a dog collar light that is relatively low in weight.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a dog collar light comprising: An LED housing, an electronics housing and attached LED housing retaining frame, a left side knob, a right side knob, a front lens, a plurality of LED lights, a battery, an elastic attachment band, said electronics housing including a fur guard, said electronics housing also including an elastic band retaining hook, an on/off switch, said LED lights retained within said LED housing and facing out toward said front lens, said LED housing including a forward facing frame capable of retaining said front lens, said electronics housing retaining frame having a concave shaped rear panel and forwardly extended left and right side panels forming a U shape, said electronics housing retaining frame also including a rearwardly facing additional attached panel allowing a standard dog collar to be trapped between said additional attached panel and said concave shaped rear panel said electronics housing retaining frame capable of capturing said main housing between said left and right side panels allowing said LED housing to pivot up or down via said right and left knobs, said left and right knobs situated outboard of said left and right side panels and centrally connected via extension posts through apertures in said side panels to said LED housing, said left and right knobs being made from transparent plastic, said plurality of LED lights being split between forward facing LED lights and left and right side facing LED lights, said left and right side facing LED lights casting light through said transparent left and right side knobs, said elastic attachment band being attached at one end to the rear portion of said additional attached panel and at the opposite end to a retaining hook mounted on the top portion of said electronics housing, said battery and said on/off switch housed within said main housing, and said on/off switch capable of turning on or off said LED lights.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
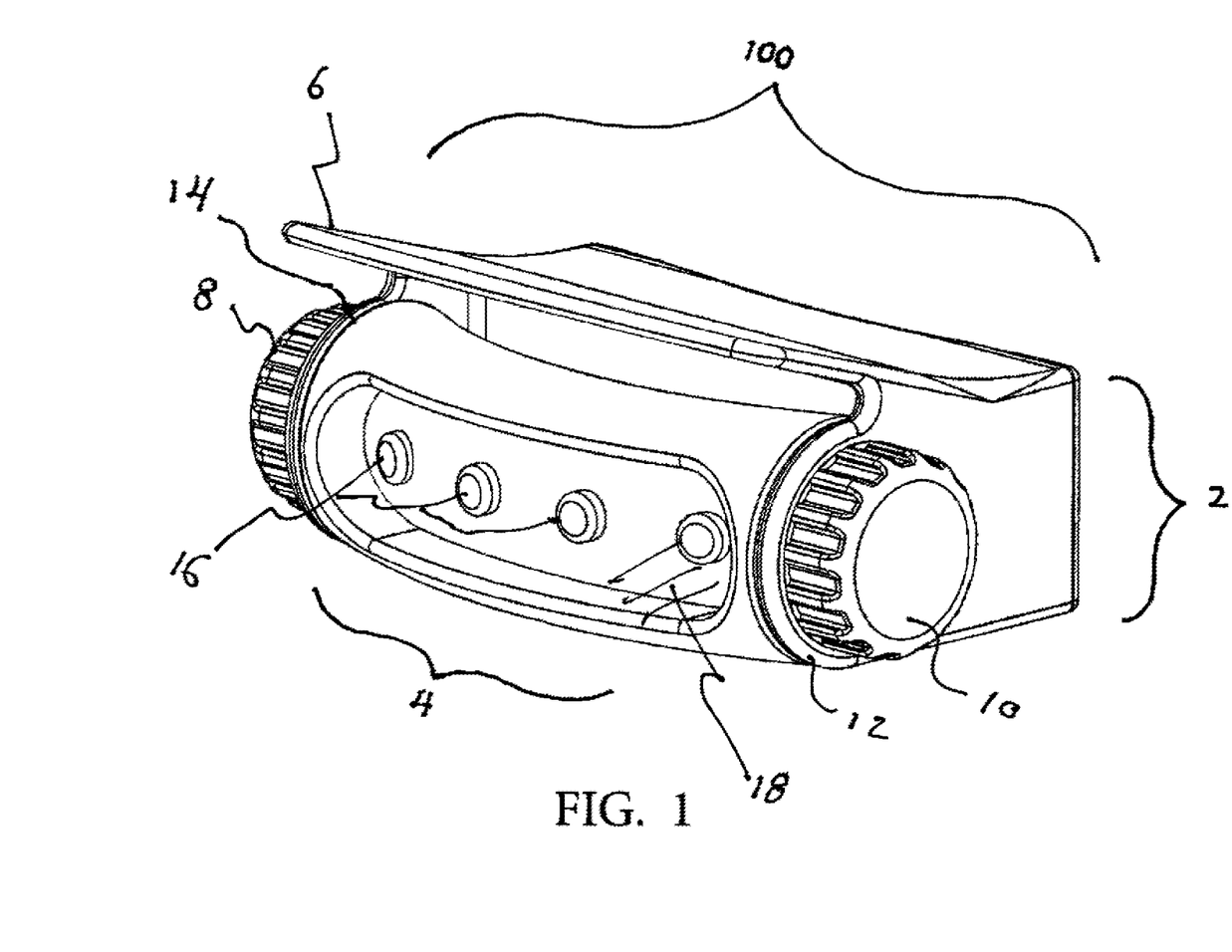
FIG. 1 is a right-side perspective view of the invention.

Referring now to FIG. 1 we see a right-side perspective view of the invention 100. An electronics housing 2 includes forward facing arms 12, 14 that help retain LED housing 4. The knobs 10, 8 include central posts that penetrate arms 8, 10 and attach to the sides of LED housing 4 so that when a person rotates the knobs 8, 10 it causes LED housing 4 to rotate up or down thereby casting light emitted from LEDs 16 onto the ground in front of a dog that is wearing the current invention 100 on his or her collar. Both front lens 18 and knobs 8, 10 are made of transparent material, allowing LED light to shine forward and to the left or right. Fur guard 6 extends over LED housing 4 to prevent a dog's fur from blocking the light emanating from LEDs 16.

Figure 2:
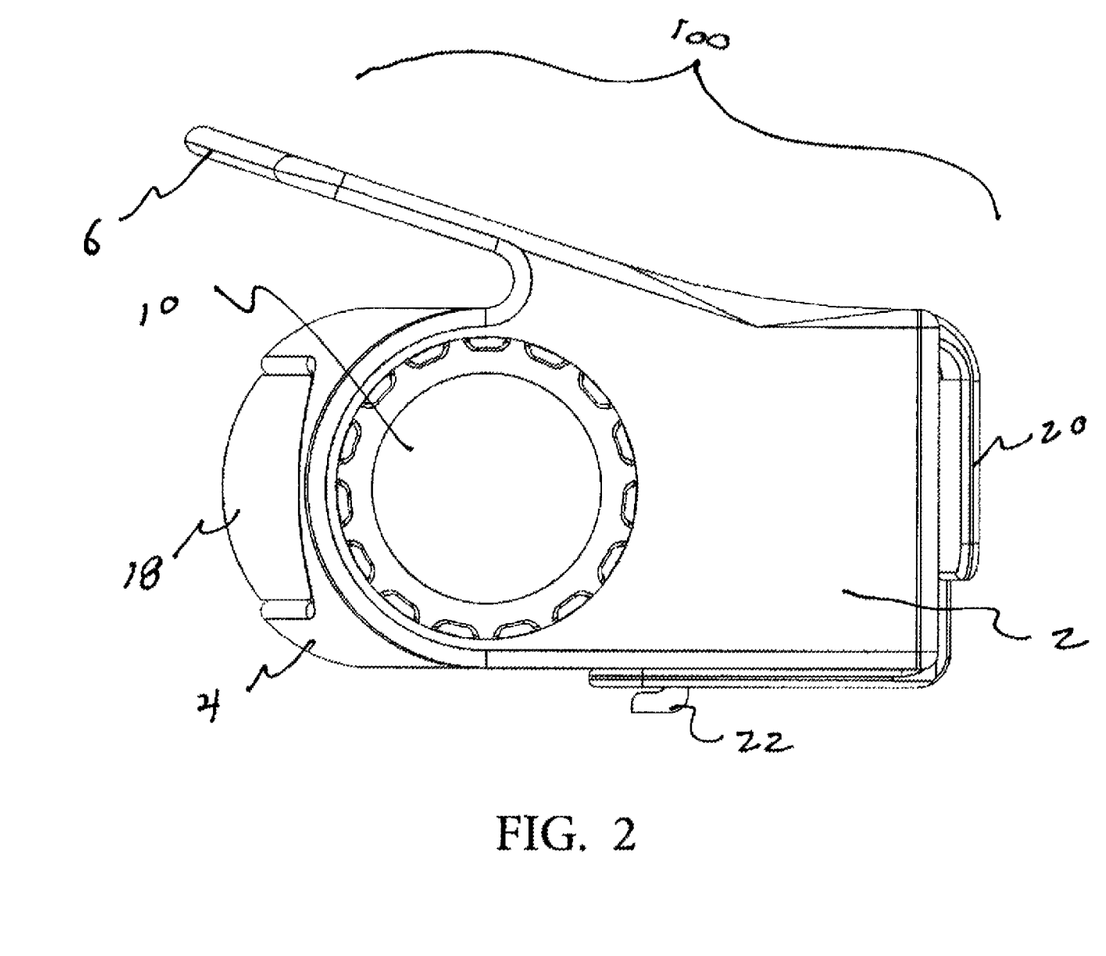
FIG. 2 is a right-side view of the invention with LED housing facing forward.

FIG. 2 is a right-side view of the invention 100 with the LED housing 4 pointing forward, thereby illuminating the entire area in front of a dog wearing the invention 100. Fur guard 6 can clearly be seen as an effective fur block extending from the top surface of electronics housing 2 for LED housing 4.

Figure 3:
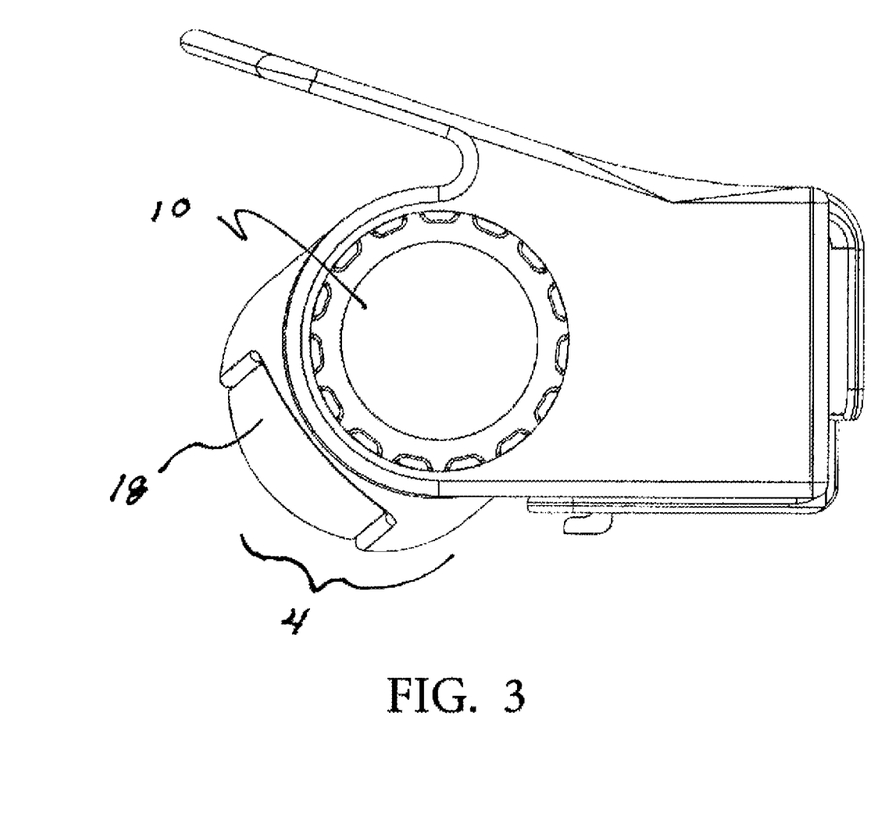
FIG. 3 is a right-side view of the invention with LED housing facing down.

FIG. 3 is a right-side view of the invention 100 with the LED housing 4 pointing down so that the ground directly in front of the dog will be illuminated.

Figure 4:
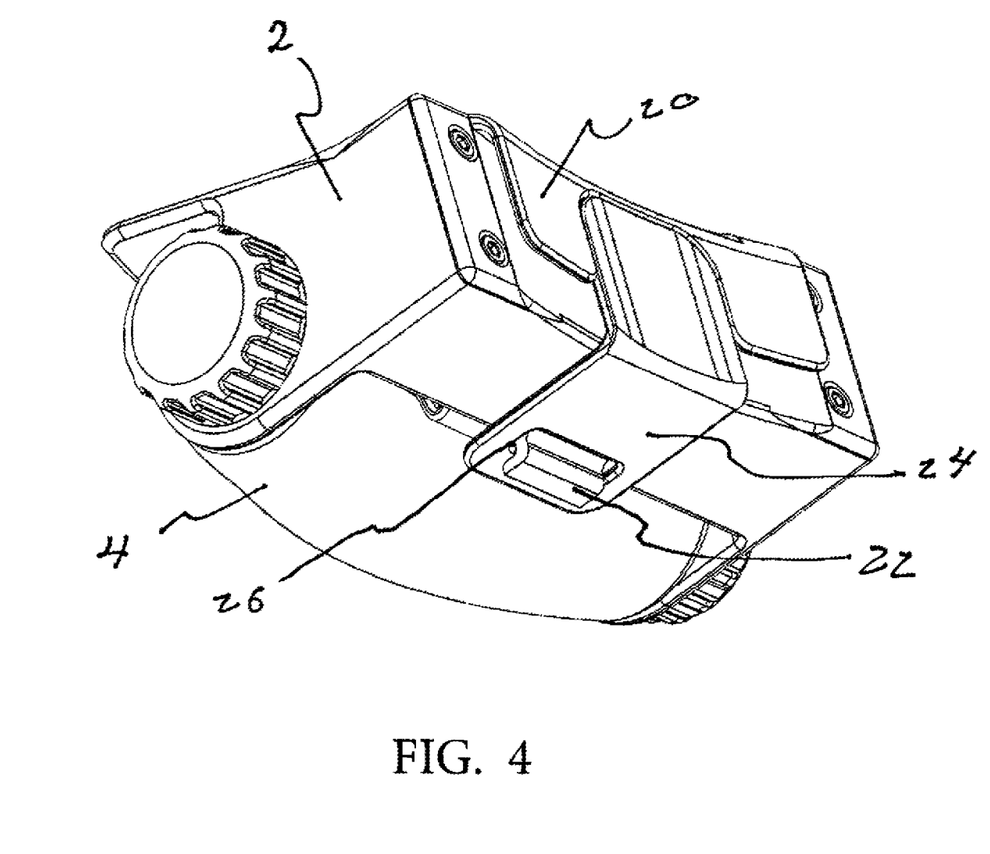
FIG. 4 is an underside perspective view of the invention showing the elastic band in the locked position.

FIG. 4 is an underside perspective view of the invention 100. Elastic band 24 can be clearly seen as being attached to collar retaining panel 20 on one end and to hook 22 on electronic housing 2 on the opposite end via aperture 26 engaging hook member 22.

Figure 5:
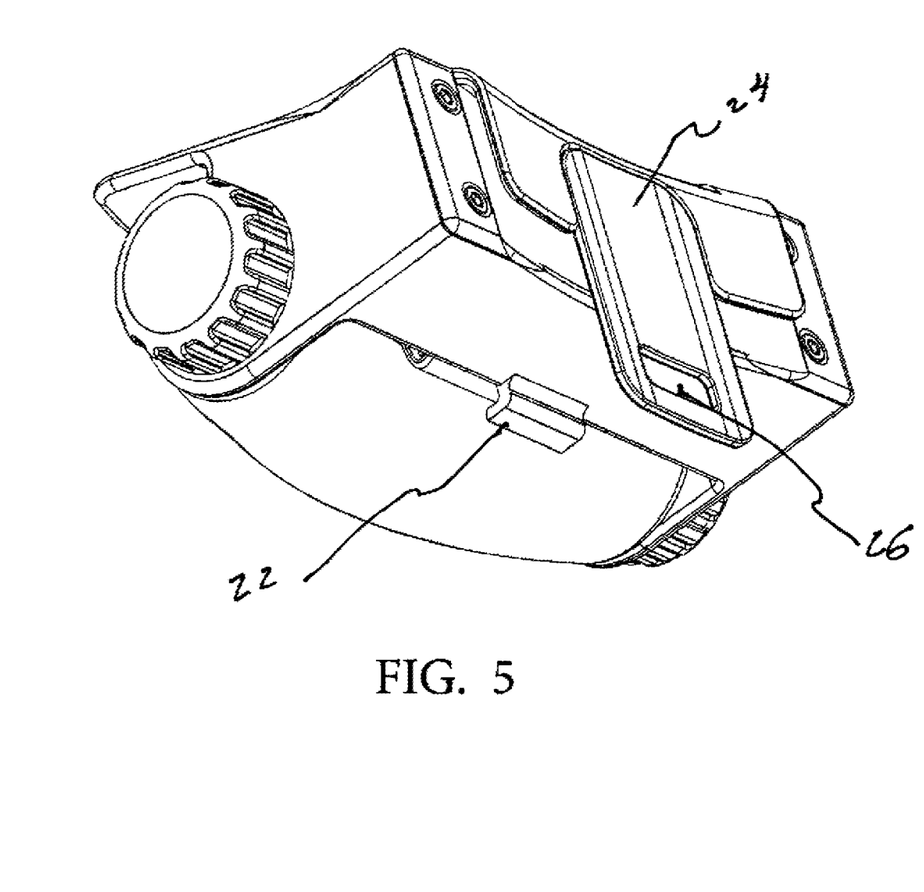
FIG. 5 is an underside perspective view of the invention showing the elastic band in the unlocked position.

FIG. 5 s an underside perspective view of the invention 100 showing the elastic band 24 disengaged from hook 22 allowing the invention to be attached to a dog collar as the collar is trapped between additional panel 20 and the rear of electronics housing 2.

Figure 6:
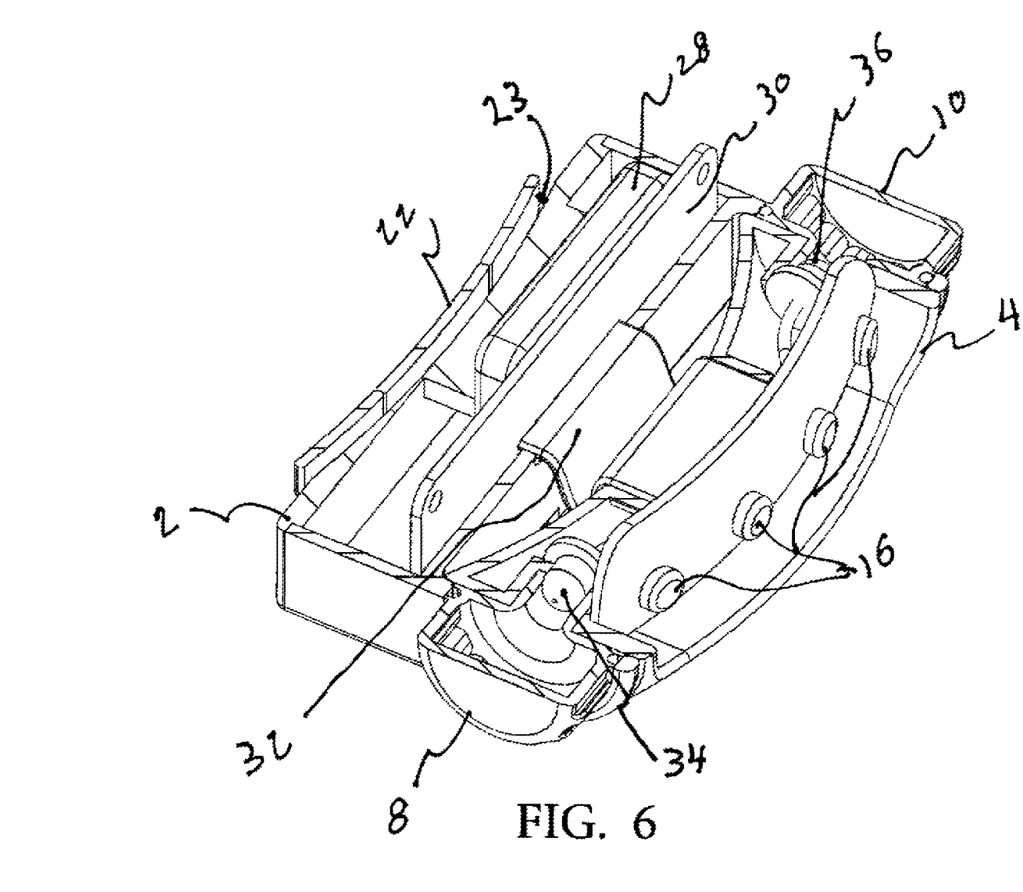
FIG. 6 is a forward-facing section view of the invention.

FIG. 6 is a forward-facing section view horizontally bisecting the invention 100. Forward facing LED lights 16 can shine light in a forward direction while LED lights 34, 36 shine light to the left and to the right. Knobs 8, 10 are transparent thereby allowing LED lights 34, 36 to shine light to the left and to the right. Printed circuit board 30 includes a charging circuit to allow battery 28 to be recharged as needed. The gap 23 between additional panel 22 and the outer surface of electronics housing 2 can be clearly seen allowing for the insertion of a dog collar within the gap 23.

Figure 7:
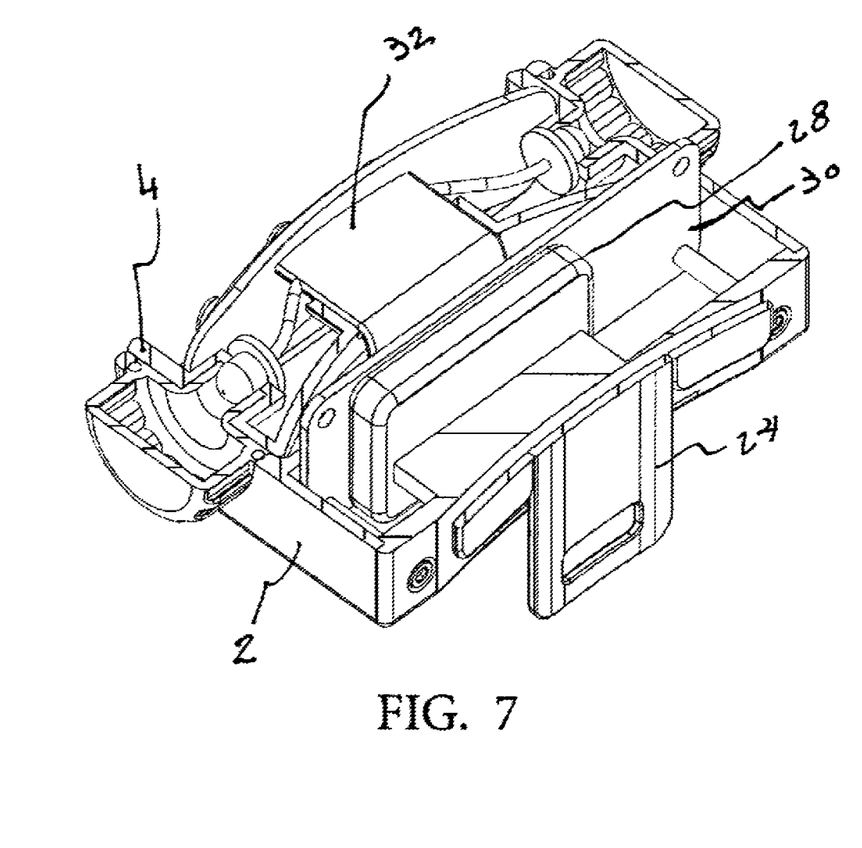
FIG. 7 is a rearward facing section view of the invention.

FIG. 7 is a rear facing section view horizontally bisecting the invention 100. Ribbon cable 32 connects the cables from all LEDs 16, 8, 10 to the PC board 30.

Figure 8:
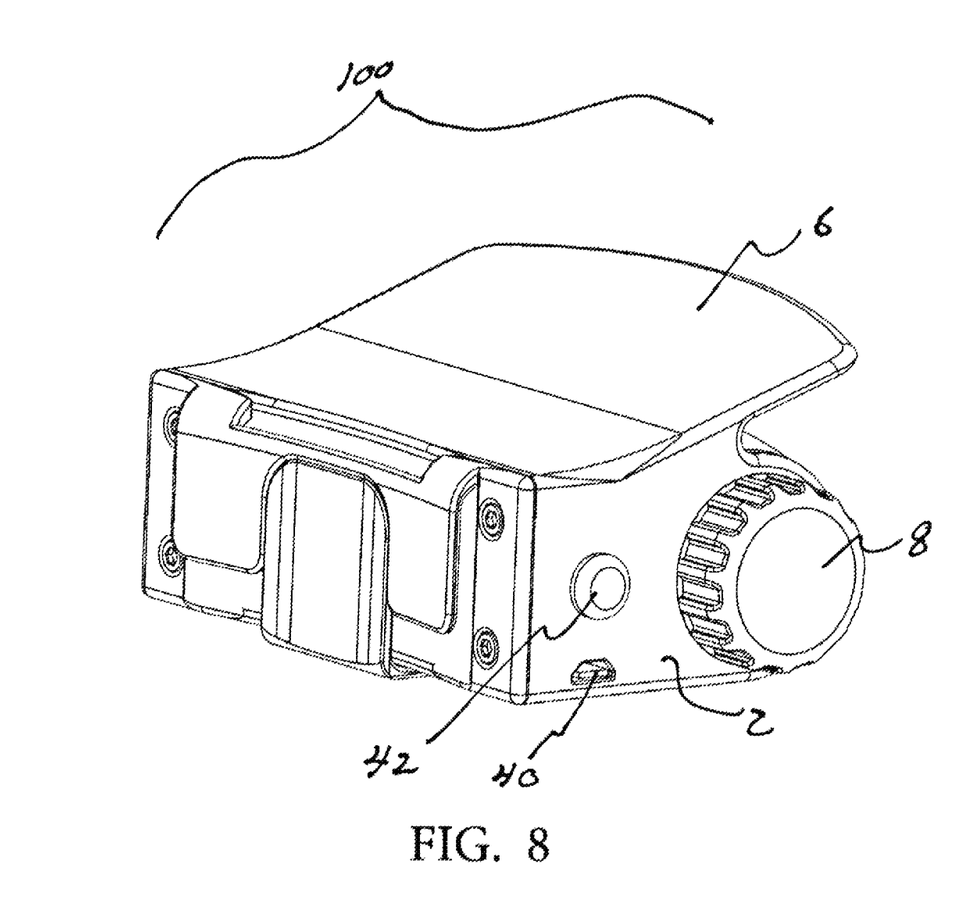
FIG. 8 is a left side perspective view of the invention.

FIG. 8 is a left side perspective view of the invention 100 showing on off switch 42 and charging port 40 located on the side of electronics housing 2. The battery 28 can be charged by plugging in a cable to port 40. The opposite end of the cable can either be plugged into a device such as a lap top computer, or can terminate in an AC to DC transformer allowing the battery to be charged by standard 110 VAC through a standard wall outlet.

The entire device 100 is light weight and can fit on a wide variety of dog collars. The light emitted from the invention helps both the dog and the human dog assistant to see where they are going in a darkened environment and can help others see the dog thereby preventing accidental contact with the dog.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A dog collar light comprising:
   an LED housing;
   an electronics housing with left and right-side panels to hold the LED housing;
   a left side knob;
   a right-side knob;
   a front lens;
   a plurality of LED lights;
   a battery;
   an elastic attachment band;
   an on/off switch;
   said electronics housing including a fur guard;
   said electronics housing also including an elastic band retaining hook;
   forward facing LED lights of said plurality of LED lights being retained within said LED housing and facing out toward said front lens;
   said LED housing including a forward-facing frame capable of retaining said front lens;
   said electronics housing having a concave shaped rear panel and said left and right-side panels which are forwardly extended so as to form a U shape;
   said electronics housing also including a rearwardly facing additional attached panel allowing a standard dog collar to be trapped between said additional attached panel and said concave shaped rear panel;
   said electronics housing capable of capturing said LED housing between said left and right-side panels allowing said LED housing to pivot up or down via said right and left side knobs;
   said left and right side knobs situated outboard of said left and right-side panels and centrally connected via extension posts through apertures in said side panels to said LED housing;
   said left and right side knobs being made from transparent plastic;
   said plurality of LED lights being split between said forward facing LED lights and a left and right side facing LED light;
   said left and right side facing LED lights casting light through said transparent left and right-side knobs;
   said elastic attachment band being attached at one end to a rear portion of said additional attached panel and at the opposite end to said retaining hook mounted on a bottom portion of said electronics housing;
   said battery and said on/off switch housed within said electronics housing; and
   said on/off switch capable of turning on or off said LED lights.

2. The dog collar light as claimed in claim 1 wherein said battery is rechargeable and wherein a recharging circuit is installed within said electronics housing.

* * * * *